(12) United States Patent
Sharp

(10) Patent No.: US 8,133,004 B2
(45) Date of Patent: Mar. 13, 2012

(54) JET ENGINE WITH ACTIVE-MAGNETIC BEARING

(75) Inventor: John Sharp, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 829 days.

(21) Appl. No.: 12/223,239

(22) PCT Filed: Jan. 19, 2007

(86) PCT No.: PCT/DE2007/000096
§ 371 (c)(1),
(2), (4) Date: Jul. 25, 2008

(87) PCT Pub. No.: WO2007/085229
PCT Pub. Date: Aug. 2, 2007

(65) Prior Publication Data
US 2010/0143100 A1   Jun. 10, 2010

(30) Foreign Application Priority Data
Jan. 27, 2006   (DE) .......................... 10 2006 003 884

(51) Int. Cl.
*F04D 29/048*   (2006.01)
(52) U.S. Cl. .............................. 415/10; 415/68; 415/229
(58) Field of Classification Search .................. 415/10, 415/68, 69, 229
See application file for complete search history.

(56) References Cited

U.S. PATENT DOCUMENTS

| | | | |
|---|---|---|---|
| 5,867,979 A | 2/1999 | Newton et al. | |
| 6,236,130 B1 | 5/2001 | Amrhein et al. | |
| 6,378,293 B1 | 4/2002 | Care et al. | |
| 6,707,201 B2 | 3/2004 | Laukien | |
| 6,881,027 B2 * | 4/2005 | Klaass et al. | 415/104 |
| 7,112,903 B1 | 9/2006 | Schob | |
| 2002/0122723 A1 | 9/2002 | Care et al. | |
| 2007/0245709 A1 * | 10/2007 | Dooley | 60/226.1 |
| 2010/0098539 A1 * | 4/2010 | Blumenthal | 415/229 |

FOREIGN PATENT DOCUMENTS

| | | |
|---|---|---|
| EP | 0 430 009 | 6/1991 |
| EP | 0 798 454 | 10/1997 |
| EP | 0 899 855 | 3/1999 |
| EP | 1 244 196 | 9/2002 |
| GB | 2 409 936 | 7/2005 |
| WO | WO 99/40334 | 8/1999 |

* cited by examiner

Primary Examiner — Stephen W Smoot
(74) Attorney, Agent, or Firm — W. F. Fasse; W. G. Fasse

(57) ABSTRACT

A jet engine includes a shaft rotatably supported in a bearing arrangement, a compressor and a turbine arranged on the shaft, and an electromechanical unit arranged centrally about the shaft axis to provide a motor function for starting the jet engine and/or a generator function for a power supply, and a function of an active magnetic bearing arrangement. The electromechanical unit is embodied as a transverse flux machine. The electromechanical unit preferably includes a rotor carrying permanent magnets and a stator with an undulating profiled stator surface.

20 Claims, 2 Drawing Sheets

JET ENGINE WITH ACTIVE-MAGNETIC BEARING

BACKGROUND INFORMATION

The present invention relates to a jet engine, especially for an aircraft, with at least one hollow shaft and/or low pressure shaft that is rotatably supported in at least one bearing about a center axis, on which shaft at least respectively one high and/or low pressure compressor as well as at least respectively one high and/or low pressure turbine is arranged, whereby the jet engine furthermore comprises an electromechanical unit in order to provide at least a motor function for starting the jet engine and/or a generator function for supplying power, whereby the electromechanical unit is centrally arranged about the center axis and whereby the electromechanical unit is further embodied as an active magnetic bearing, which supports or bears the hollow shaft and/or low pressure shaft.

Such jet engines are sufficiently known, whereby the means for starting the jet engine as well as the means for generating the electric power are arranged separate from one another on the jet engine. For being brought into operation, the jet engine must be mechanically started, whereby in a two-shaft-engine the shaft of the high pressure compressor is set into rotation via a mechanical engagement or interaction. Furthermore, jet engines comprise means for generating an electric power, which can be arranged in the form of a generator in or on the engine. In that regard, the electric power is needed for the operation of various electrical devices of the aircraft, whereby present developments show that the required electric power of the aircraft is further increasing due to a growing electrification of various different systems or devices. The jet engine considered according to the present invention especially relates to a fan engine, which is embodied as a two-shaft-engine and the fan represents a low pressure compressor which pre-compresses the air flowing into the engine and also generates a bypass shroud flow around the centrally ejected or discharged hot exhaust gas jet.

From the US 2002/0122723 A1, a jet engine of the above general type is known, which comprises a generator that is integrated in the high pressure compressor of the jet engine. The engine comprises compressor blades that are shrouded, whereby an electric generator is arranged outside of the shroud. This consists of a stator that encompasses an electric coil, as well as a rotor that is connected with the engine shaft in such a manner that this carries out a rotational motion in the same manner. The rotor arrangement carries out a rotational motion within the stator, and induces an electric voltage in the coil of the stator. The rotor elements are arranged on the outside on the blade elements of the high pressure compressor and extend radially outwardly into the stator of the generator.

The bearing support of the hollow shaft, on which the high pressure compressor is rotatably arranged, as well as the bearing support of the low pressure shaft, on which the low pressure compressor is arranged, are supported via mechanical bearings, such as roller bearings for example. Additionally, the at least one shaft of the jet engine can be rotatably supported via active magnetic bearings, whereby the active magnetic bearing arrangement according to the prior state of the art merely represents a respective partial bearing support of the shafts. For providing a lubrication system for the mechanical bearing arrangement, especially a so-called gearbox is necessary, which is arranged within the engine pod on the outside of the jet engine and is driven via a shaft arrangement, the so-called power shaft, by means of a power takeoff from at least the low pressure shaft and/or the hollow shaft.

Such a combined bearing support between mechanical and active magnetic bearing support is disclosed in the U.S. Pat. No. 6,378,293 B1. Therein a jet engine comprises a plurality of shafts, which respectively connect the compressor sides with the turbine sides of the jet engine. In the hot part of the jet engine, these shafts are supported by electromagnetic bearing arrangements, whereby mechanical bearing arrangements support the remaining part of the turbine. In that regard, while the arrangement offers a partial bearing support by means of electromagnetic bearings, yet nonetheless a lubrication system is further necessary due to the remaining mechanical bearing arrangements. The generator for generating the electric power, which is necessary in order to supply the electromagnetic bearing arrangements, is therein arranged at the end side far from the respective electromagnetic bearing arrangements, and is embodied as a separate unit. A portion of the electric power provided by the generator is supplied to the aircraft via an output, whereby the portion of the electric power that is needed for supplying the electromagnetic bearing arrangements is supplied to the electromagnetic bearing arrangements via a control unit by means of separate electric lines.

In the known systems although they comprise a generator, electromagnetic bearing arrangements as well as corresponding power electronics for the control and respective connection of the system, the problem arises that a lubrication system is further necessary due to the remaining mechanical bearing support, which lubrication system must especially be made available through an outside arranged gearbox. Furthermore a high space demand is required, because both the respective electromagnetic bearing arrangements as well as the generator arrangement are accommodated separate from one another in the jet engine. Due to the high costs arising thereby as well as the high weight and the expanded space demand, the use of an active magnetic bearing is realizable only with limitations or is not sensibly economically realizable. With respect to the known generator arrangement within the jet engine, the problem further arises that the generator only serves for power generation, but is not suitable as an electric motor for starting the jet engine, whereby the starting function must further be realized via the gearbox arranged outside on the jet engine. The gearbox can encompass both a starter function as well as also a generator function, whereby this requires a considerable space demand on the circumference of the jet engine, represents a high weight, and comprises a high maintenance requirement. A further disadvantage exists in that the gearbox encompasses means embodied for starting the jet engine, which must be carried along as an unusable device during the flight operation and thus brings about a "dead weight".

In this regard, the U.S. Pat. No. 5,867,979 attempts to provide a remedy that proposes several motor/generator units, which also can be combined with an electromagnetic shaft bearing.

However, in connection with the use of combined motor/generator/bearing units, further technical problems result, which arise especially in maneuvers with high g loads or shock loads. Hereby the air gap in the electromagnetic bearing can become so small that the so-called "Barkhausen Effect" occurs. According to the Barkhausen Effect, the magnetization of ferromagnetic materials takes place in many small jumps or steps. The approach of a magnetic pole to an iron piece about which a coil is placed increases the magnetic induction in the iron piece due to flipping or reversal of the individual ferromagnetic domains and respectively produces a momentary induction current in the coil.

In the case of the magnetic bearing, this leads to the result that the mutual opposite repulsion forces, on which this bearing principle is based, collapse and produce a force in the opposite direction, that is to say attraction forces.

This is not acceptable especially in aircraft. It is therefore the object of the present invention to provide a jet engine in which means for the bearing support of the at least one engine shaft as well as means for the power supply of the active magnetic bearing arrangement and of the aircraft as well as means for the starting of the jet engine are embodied in an integrated unit in a space and weight saving manner. Thereby, the disadvantages of the prior state of the art are to be avoided and the high safety requirements necessary for the operation of aircraft are to be satisfied.

SUMMARY OF THE INVENTION

The above object has been achieved in a jet engine of the abovementioned general type, wherein the electromechanical unit is embodied as a transverse flux machine.

This solution offers the advantage, that the advanced electromechanical unit, in addition to a motor-generator function, additionally encompasses the function of an active magnetic bearing. In that regard, the electric power produced by the generator function of the electromechanical unit can be so large, that despite the power supply to the internal active magnetic bearing arrangement moreover an external electric power supply of the aircraft can be achieved. By means of the proposed functional scope of the electromechanical unit, the possibility is provided, to remove the lubrication system that would otherwise be necessary for a mechanical bearing arrangement, which lubrication system is mainly provided in the externally arranged gearbox. If the electromechanical unit additionally offers a generator function for the power generation as well as a starter function in the form of an electric drive motor of the shafts of the jet engine, thereby the possibility is provided, to remove the gearbox as well as the power shaft out of the construction of the jet engine. From that there arise special advantages, which are to be seen with regard to a weight savings, whereby additionally due to a space savings the engine pod can be embodied smaller so that furthermore the air resistance or drag is reduced. Further advantages are to be seen in an improved maintenance possibility, whereby the maintenance scope overall can become smaller. In that regard, the electromechanical unit is embodied according to the invention as a transverse flux machine, in which both the motor/generator function as well as also the bearing function is integrated. In that regard, the circuit connection of the respective modules ensures that all poles of the stator comprise the required polarity. Thereby it can be ensured that the oppositely located polarized permanent magnet segment is turned in the correct position. If this control algorithm is repeated, each module contributes to one twelfth of the power supply. A different circuit switching algorithm of the power electronics is necessary in order to fulfill the motor function. Thus, for example, the rotor position can be measured, whereby this can take place either with an additional apparatus or by the measurement of the change or alternation of the electrical parameters, such as the inductivity for example.

Advantageously the electromechanical unit is embodied as a radial and/or axial bearing arrangement. In that regard the axial bearing arrangement acts mainly in the thrust direction in order to transmit the axial thrust force of the jet engine onto the resting or stationary parts of the engine and thus onto the aircraft. In a motor the rotational motion is brought about by tangential force components in order to produce a rotational moment or torque. This magnetic force, which is also referred to as the "Lorenz" force, is first used for the motor/generator function in the proposed electromechanical unit. The function of the active magnetic bearing, in contrast, is based on the so-called "Maxwell" force, which leads to a magnetic repulsion force between a stator and a rotor, whereby an air gap is maintained between these components. Accordingly this can both center a centrally running shaft in the radial direction, as well as also transmit a thrust force via an axial bearing part. The compensation between the magnitude of the radial force and of the tangential force for driving the motor/generator unit can occur at any time due to a maximum of the air gap, which has a direct influence on the magnetic flux. Therefore there arises a direct reciprocal interaction between the magnitude of the "Maxwell" bearing force and of the "Lorenz" generator force, whereby this ratio can be regulated by a control unit encompassing a power electronics circuit.

A further advantageous embodiment of the invention provides that the jet engine comprises an electric storage apparatus in order to electrically compensate mechanical load peaks of the active magnetic bearing arrangement. These load peaks can, for example, be based on increased g-loads, or can be caused by shocks or impacts for example during the landing of the aircraft. The load peaks require a strengthened magnetic flux, which temporarily requires an increased electric power which cannot or not sufficiently be produced by the generator function of the electromechanical unit. For this purpose, storage apparatuses can be provided, which, for example, encompass batteries, capacitors or other electric storage means. The temporary additional power can temporarily be circuit-added from the mentioned storage apparatuses to the actual power supply by the generator, whereby the air gap being established between the bearing components can be used as a guide magnitude for a regulating arrangement.

As a further measure improving the invention it is provided that the electromechanical unit comprises sections which are selectively switchable to a motor and/or a bearing function. Thereby during the normal flight operation the generator function of the electromechanical unit can preferably be carried out or utilized in order to provide a correspondingly large electric power for the aircraft. In this static or steady state, the active magnetic bearing arrangement requires only a small portion of the power scope of the electromechanical unit, which is sufficient for the transmission of the normal bearing forces.

However, in connection with high g-loads or under the influence of high shock or impact loads, the system of the electric power management within the aircraft can require a larger portion for the activation of the active magnetic bearing arrangement. This switch-over possibility can additionally be supported by the above mentioned storage apparatus.

According to a further advantageous embodiment of the invention it is provided that the electromechanical unit comprises regulation-technical means to actively damp vibrations by means of the active magnetic bearing arrangement, which vibrations especially arise due to the rotating hollow shaft and/or the low pressure shaft. This active damping can be realized by an electrodynamic counter-control, in order to squelch arising vibrations. Additionally, a contact-free bearing arrangement via active magnetic components offers the constructive advantage that an oscillation or vibration transmission due to a solid body contact cannot take place.

For thermal reasons it can be provided that the electromechanical unit comprises electrically driven means for cooling it. Especially due to the omission of an external oil supply system for mechanical bearings, additionally the cooling function via an oil flow is also omitted. Possible thermal problems can be alleviated by means of an electric cooling which prevents an excessive heat development in the electromechanical unit. Moreover, the electromagnetic unit can preferably be arranged on the inside on the first or at least one of the first high pressure compressor stages, whereby a generator can be provided on the low pressure stage. Basically it is, however, possible to arrange the function of the electromechanical unit with any desired scope or circumference at each position of the jet engine at which a bearing support is necessary. Additionally there exists the possibility, by means of an integrated electromechanical unit arranged at a first location, to supply a pure active magnetic bearing arrangement at a second location, in that the power supply of the generator part of the electromagnetic unit at the first location is branched off to the active magnetic bearing arrangement at the second location. Thereby the possibility can advantageously be used, to provide the axial bearing arrangement via which the thrust force of the jet engine is transmitted, at the first location, at which the electromechanical unit with full functional scope is arranged, whereby the individual active magnetic bearing arrangement can be embodied as a radial bearing arrangement. In that regard, the at least one section of the electromechanical unit for fulfilling the function of the active magnetic bearing arrangement is preferably formed by additional conductor line windings in the stator. Thereby the "Maxwell" forces can be controlled by a corresponding power control in such a manner so that a switch-over of the proportional motor or bearing function is possible. The control of the current through the additional windings enables for the unit the function of the active magnetic bearing support and compensates every tendency toward an eccentric movement of the shaft, which otherwise would be formed by a mechanical bearing.

Advantageously the electromechanical unit is constructed of individual modules which are electrically separately activatable, in order to minimize magnetic reciprocal effects between the modules. These are activatable separately from one another so that the modular construction leads to a high reliability or fault tolerance, which is especially necessary in air travel applications, and furthermore makes possible an even more flexible control of the optional operational types or modes of the electromechanical unit.

For constructive reasons it is especially advantageous that the electromechanical unit is formed of at least twelve individual modules, which respectively encompass at least one stator, one rotor embodied with permanent magnets and one power electronics, in order to arrange on a common shaft at least twelve electromechanical sections that are independent from one another.

Furthermore, advantageous embodiments of the invention provide that the rotor moves around the stator, whereby a profiled stator surface, which stands under the permanent magnet segments rotating thereover, is embodied in a wavy shape with stator surface peaks. In that regard, the spacing distance between two stator surface peaks advantageously corresponds with the width of the rotor permanent magnet segment surfaces. Hereby the "Barkhausen" reversal of the magnetic field is effectively avoided and a collapsing of the bearing function during the flight operation is prevented.

BRIEF DESCRIPTION OF THE DRAWINGS

Further measures improving the invention are set forth in the dependent claims or are set forth in further detail in the following together with the description of a preferred example embodiment of the invention with reference to the Figures.

It is shown by.

DETAILED DESCRIPTION OF EXAMPLE EMBODIMENTS OF THE INVENTION

The Figures involve merely exemplary schematic illustrations.

Figure 1:
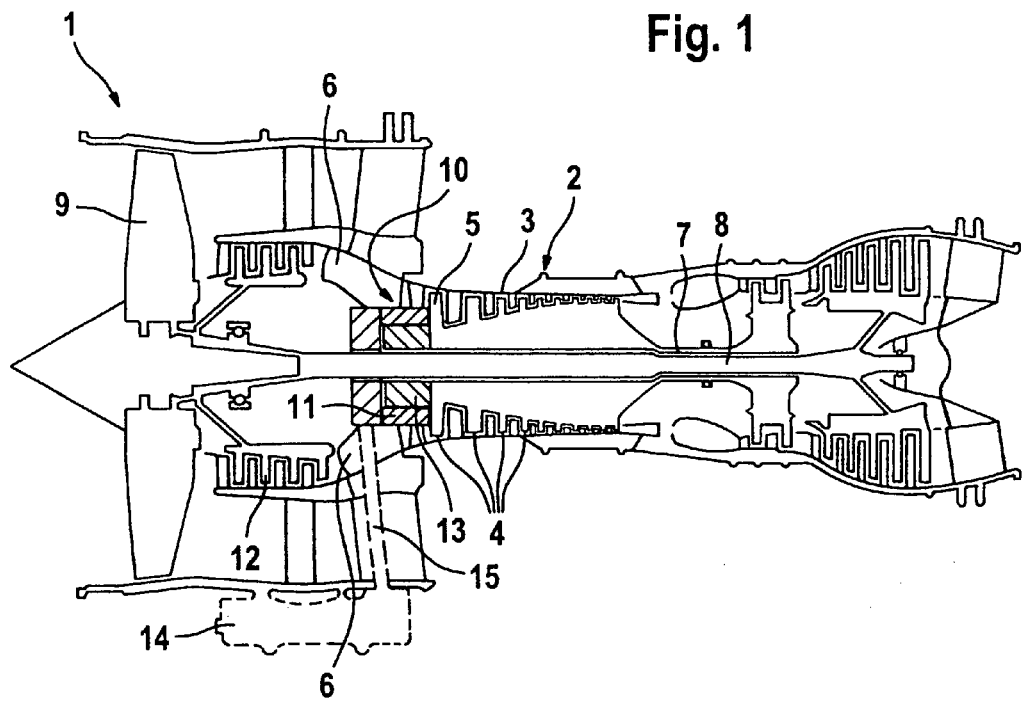
FIG. 1 a cross section through a jet engine with an electromechanical unit which is arranged in the rotation plane of the first compressor stages of the high pressure compressor.

The jet engine 1 illustrated in FIG. 1 comprises a high pressure compressor 2, which encompasses a compressor housing 3. In the compressor housing 3, several compressor stages 4 are rotatably supported, whereby the compressor stages 4 comprise blade elements 5 which compress air entering through an intake channel 6.

The compression of the entering air in that regard is achieved in stages one-after-another, via a plurality of compressor stages 4, which follow after one another in a parallel arrangement in the flow direction of the air to be compressed. The compressor stages 4 are rotatably supported on a hollow shaft 7, whereby a low pressure shaft 8 extends through the hollow shaft 7. A fan 9 is rotatably supported on the low pressure shaft 8, which fan, as a low pressure stage, precompresses the in-flowing air and also produces a bypass shroud flow around the inner flow area that is formed by the high pressure compressor 2.

In the forward portion of the high pressure compressor 2, an electromechanical unit 10 is arranged, for example at the height of the first and second compressor stage 4, which electromechanical unit 10 extends in a ring shape around the compressor housing 3 on the circumference side. The part of the electromechanical unit 10 arranged outside on the compressor housing encompasses a stator 11, which forms the resting or stationary part of the electromechanical unit 10. The arrangement of the electromechanical unit 10 can similarly take place in the area of the low pressure compressor 12, whereby this arrangement is not illustrated in FIG. 1 for reasons of simplification. The stator 11 is connected in a stationary manner to the stator construction of the jet engine 1, independent of the location of the arrangement of the electromechanical unit 10, and the stator 11 forms both the stationary part of the motor/generator module as well as also the stationary part of the active magnetic bearing. Furthermore the electromechanical unit 10 encompasses a rotor 13, which is mechanically connected with the rotating arrangement of the compressor stages 4. Thus, the rotor 13 forms the rotating part of the electromechanical unit 10, whereby this forms both the radial bearing part as well as also the axial bearing part of the active magnetic bearing, and simultaneously encompasses the rotating armature part of the motor/generator module. On the bottom side of the jet engine 1, a gearbox 14 is illustrated in dashed lines, which is mechanically connected with the hollow shaft 7 via a similarly dashed illustrated drive train 15. The drive train 15 takes-off a rotational motion from the hollow shaft 7 via a bevel gearing and drives various aggregates or apparatuses which are arranged in the gearbox 14, whereby the gearbox 14 likewise can include a starter function for the starting of the jet engine 1. According to the example embodiment of the present invention, a gearbox 14 as well as a drive train 15 is illustrated, whereby, merely for the sake of clarification, this represents the construction of a jet engine 1 according to the prior state of the art. According to the present invention, the gearbox 14 as well as the drive train 15 can be omitted, because neither an electric power supply through the gearbox 14 nor an oil supply is necessary, when the electromechanical unit 10 according to the proposed embodiment fulfills the function of the power supply, of the starter of the jet engine 1 as well as the bearing function, so that a lubrication by means of a lubrication system is no longer necessary.

Figure 2:
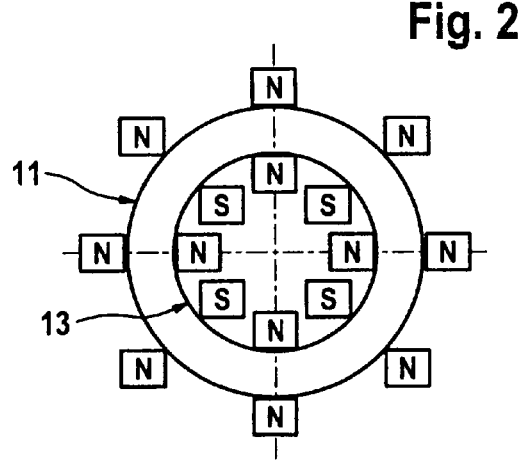
FIG. 2 a possible distribution of north and south poles between a stator and a rotor of an electromechanical unit.

The arrangement of the magnetic polings between the stator 11 and the rotor 13 is shown in FIG. 2. In that regard, eight magnetic poles are shown in the rotor 13, whereby this serves for the simplification, because in a technical realization of the proposed solution approximately 50 to approximately 100 magnetic poles of north poles N and south poles S can be arranged on the circumference of the rotor 13. In the consideration of the oppositely located north poles N and south poles S it becomes clear, that a repulsive force can be produced depending on the existing arrangement of the poles to one another. Similarly it becomes clear, that mutually attractive forces can arise if opposite polings are located across from one another. If the respective repulsive and attractive forces are equal to one another, that is to say that they cancel each other, it becomes clear that so far no active magnetic bearing function can yet be realized. However, the stator can be electromagnetically excited, and the flux density in the range of 2 Tesla (T) dependent on the type of the soft iron material can be produced. Normally the magnetic segments are magnetized with approximately 1.2 T (Nd2BFe), whereby due to an achievable magnetic saturation, no further increase of the magnetic flux can be achieved through the magnetic segments. When two same or equal poles are brought into an arrangement lying opposite or across from one another, the magnetic flux is compressed or made denser, which, for example, can occur by an eccentric orientation of the rotor 13 relative to the stator 11, which leads to the result that the magnetic flux density in the air gap gives rise to a value of 3.2 T due to a superposition of the two separate values, whereby a maximum value is producible. If two opposite poles are located opposite or across from one another, then the density of the magnetic flux is limited to the value of the magnetic segment of 1.2 T. This leads to a net force difference of $3.2^2 - 1.2^2 = 8.8$. That is to say, that the repulsive forces are stronger than the mutual attractive forces so that an active magnetic bearing effect can be achieved. If the weight of the rotor of the jet engine 1 is left out of consideration, the resulting repulsive force leads to a concentric bearing support of the rotor 13 in the stator 11. In a technical realization, the electromechanical unit 10 must take up the weight of the rotor as well as further operating forces, which leads to a shifting displacement of the rotor 13 within the stator 11. This shifting displacement can lead to an increase of the repulsive forces, when the air gap between the rotor 13 and the stator 11 is made smaller on one side.

Figure 3:
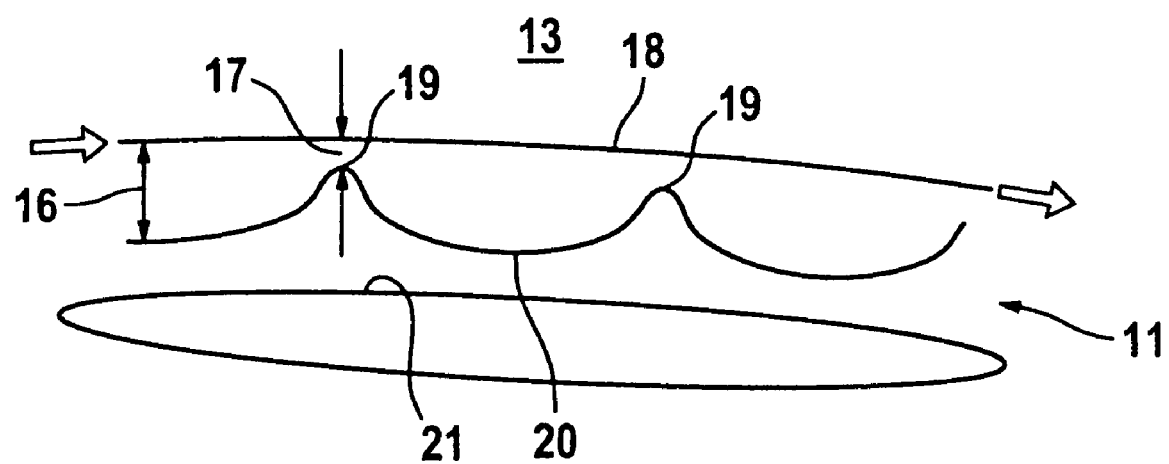
FIG. 3 a cut-out section-wise advantageous embodiment of a module of a motor/bearing arrangement.

FIG. 3 shows, in a cut-out section manner, an advantageous embodiment of a module of a motor/bearing arrangement, whereby the rotor 13, which carries the permanent magnet, moves about the stator 11, which carries the electric coils, in order to provide the electromagnetic field. In that regard, the profiled stator surface 20, which stands under the permanent magnet segment rotating thereover, has a wave pattern with stator surface peaks 19, whereby the length of each "wave" corresponds with the width of the rotor permanent magnet segment surface 18. The maximum air gap 16 according to this design is located in the "wave valley", while the minimum air gap 17 is located on the stator surface peak 19. Furthermore the inner surface of the stator disk 21 is shown in FIG. 3.

In order to avoid the "Barkhausen" reversal of the magnetic field, the gap should typically be approximately 0.8 mm, with a minimum gap set to 0.2 mm. On the one hand, this is prescribed by the maximum permissible radial displacement in a gas turbine between rotating components and housing components, which amounts to approximately 1 mm. The minimum gap must therefore be smaller than 1 mm. On the other hand, this is defined by the output power of an electrical machine of 150 kVA, in which typically the operating gap lies between 0.5 mm to 1 mm.

The invention is not limited in its embodiment to the preferred example embodiment set forth above. Rather, a number of variants is conceivable, which makes use of the illustrated solution even in embodiments of a fundamentally different type.

The invention claimed is:

1. Jet engine, with at least one hollow shaft and/or low pressure shaft rotatably supported in at least one bearing arrangement about a center axis, on which shaft at least one compressor as well as at least one turbine is arranged, whereby the jet engine comprises an electromechanical unit centrally arranged about the center axis, which electromechanical unit is embodied as a starter and/or a generator, and whereby the electromechanical unit is further embodied as an active magnetic bearing arrangement, which supports the hollow shaft and/or low pressure shaft, characterized in that the electromechanical unit is embodied as a transverse flux machine, wherein the electromechanical unit comprises a rotor carrying permanent magnet segments, and further comprises a stator having a profiled stator surface, and wherein the rotor moves about the stator, whereby the profiled stator surface, which stands below the permanent magnet segments rotating thereover, is embodied wave-shaped with stator surface peaks.

2. A jet engine comprising:

a shaft extending along an axis;

a compressor arranged on said shaft;

a turbine arranged on said shaft; and an electromechanical transverse flux machine arranged centrally about said axis and comprising an active magnetic bearing arrangement that rotatably supports said shaft to be rotatable about said axis;

wherein:

said electromechanical transverse flux machine is further selectively operable as at least one of a starter motor and a generator for said jet engine;

said electromechanical transverse flux machine comprises a rotatable rotor that carries permanent magnets and is connected to said shaft, and a stator that is mounted stationary relative to said rotor with a spacing gap therebetween; and adjacent to said rotor, said stator has an undulating profiled stator surface with alternating wave-shaped surface peaks and wave-shaped surface troughs.

3. The jet engine according to claim 2, wherein said rotor comprises a plurality of permanent magnet segments which are respectively bounded by permanent magnet segment surfaces, and wherein a wavelength distance between two successive ones of said wave-shaped surface peaks of said undulating profiled stator surface corresponds to a width of one of said permanent magnet segment surfaces of said rotor.

4. The jet engine according to claim 2, wherein said rotor is rotatable over and around said stator, and said undulating profiled stator surface is located under said rotor with said spacing gap therebetween.

5. The jet engine according to claim 2, wherein said stator is arranged at least partially radially outwardly around said rotor.

6. The jet engine according to claim 2, wherein said rotor further comprises a rotating armature of said starter or said generator.

7. The jet engine according to claim 2, wherein said stator carries electromagnetic coils that are electromagnetically excitable.

8. The jet engine according to claim 2, wherein said spacing gap between said stator and said rotor includes a minimum gap between said rotor and said wave-shaped surface peaks of said undulating profiled stator surface, and includes a maximum gap between said rotor and said wave-shaped surface troughs of said undulating profiled stator surface.

9. The jet engine according to claim 2, wherein said spacing gap between said stator and said rotor is in a range from 0.2 mm to 0.8 mm.

10. The jet engine according to claim 2, wherein said active magnetic bearing arrangement comprises a radial bearing arrangement.

11. The jet engine according to claim 2, wherein said active magnetic bearing arrangement comprises an axial bearing arrangement.

12. The jet engine according to claim 2, further comprising an electrical storage device electrically connected to said electromechanical transverse flux machine.

13. The jet engine according to claim 2, wherein said electromechanical transverse flux machine comprises sections that can be selectively electrically switched to function as a section of said active magnetic bearing arrangement or as a section of said starter motor.

14. The jet engine according to claim 2, further comprising a regulating arrangement connected to said active magnetic bearing arrangement for damping vibrations.

15. The jet engine according to claim 2, further comprising an electrically operated cooling arrangement connected to said electromechanical transverse flux machine.

16. The jet engine according to claim 2, wherein said active magnetic bearing arrangement comprises a rotor and a stator, and said stator comprises additional conductor line windings.

17. The jet engine according to claim 2, wherein said electromechanical transverse flux machine comprises plural modules that are electrically separately activatable so as to minimize magnetic reciprocal effects between said modules.

18. The jet engine according to claim 17, wherein said plural modules comprise at least twelve individual and independent modules arranged in common along said shaft, wherein each one of said modules respectively comprises a stationary stator, a rotatable rotor that carries permanent magnets and is connected to said shaft, and a power electronics connected to said stator.

19. The jet engine according to claim 2, wherein said wave-shaped surface troughs are concavely curved, and said wave-shaped surface peaks are convexly curved with a smaller radius of curvature than said wave-shaped surface troughs.

20. The jet engine according to claim 2, wherein said jet engine is an aircraft engine.

* * * * *